United States Patent [19]

Traube et al.

[11] Patent Number: 4,964,160
[45] Date of Patent: Oct. 16, 1990

[54] PROTECTOR DEVICE

[75] Inventors: Roy F. Traube, Colchester; Michael J. Danks, Birmingham, both of England

[73] Assignee: British Telecommunications public limited company, Great Britain

[21] Appl. No.: 304,283

[22] Filed: Jan. 31, 1989

[30] Foreign Application Priority Data

Feb. 3, 1988 [GB] United Kingdom ............... 8802434

[51] Int. Cl.$^5$ .............................................. H02H 9/00
[52] U.S. Cl. .................................... 379/412; 361/119; 361/56
[58] Field of Search ...................... 379/412, 387, 405; 361/56, 91, 119, 104

[56] References Cited

U.S. PATENT DOCUMENTS

| | | | |
|---|---|---|---|
| 3,839,692 | 10/1974 | Plasko | 361/104 X |
| 4,168,514 | 9/1979 | Howell | 361/56 |
| 4,502,088 | 2/1985 | Baumbach | 361/124 |
| 4,587,588 | 5/1986 | Goldstein | 361/56 X |
| 4,791,523 | 12/1988 | Pick et al. | 361/104 |

Primary Examiner—Jin F. Ng
Assistant Examiner—Randall S. Vaas
Attorney, Agent, or Firm—Nixon & Vanderhye

[57] ABSTRACT

A Protector device 20 connectable between a subscribers line pair and the telephone exchange includes a protector P1 comprising a pair of foldback diodes and fuses F1 and F2 in series with the respective lines which fuses incorporate an impedance/heater element 25. A pair of contacts S1, S2 with meltable insulation provides a fail-safe short circuit path following continued operation of the protector P1. The device 20 will deal with accidental contact with mains voltages that appear on the lines and will also handle short surges due to lightning strikes for example.

20 Claims, 3 Drawing Sheets

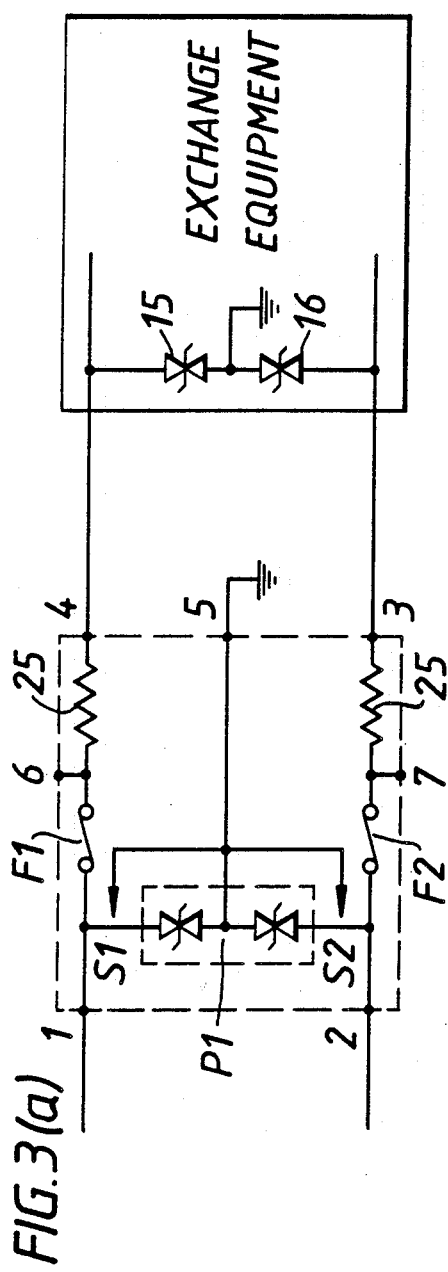
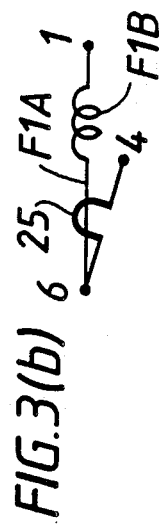
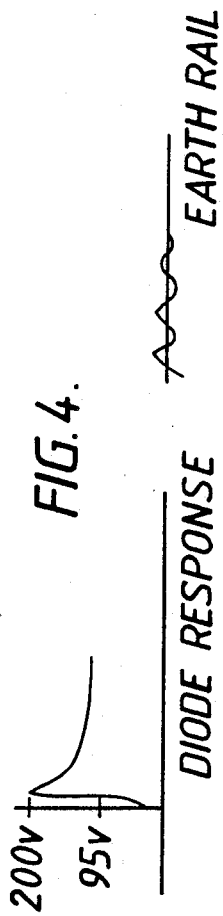
FIG.3(a)
FIG.3(b)
FIG.4.

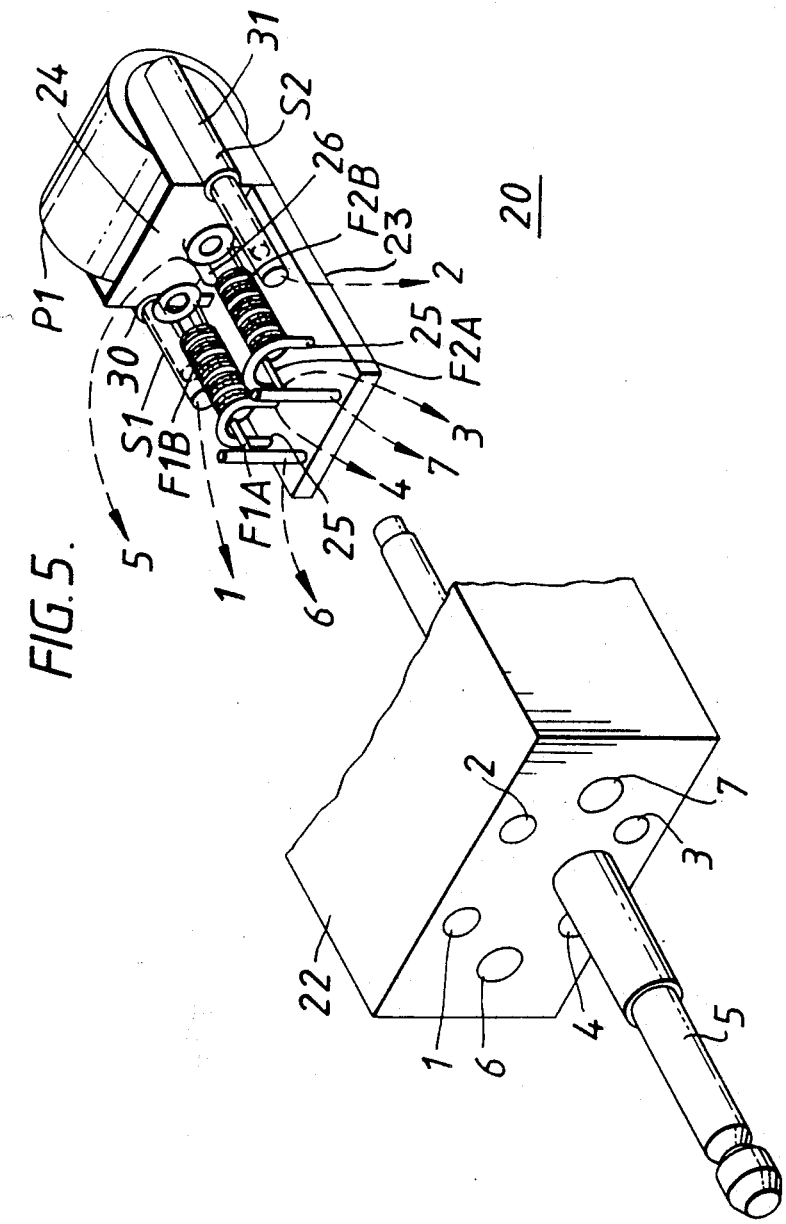

PROTECTOR DEVICE

The invention relates to a protector device for use in telecommunication systems.

In telephone exchanges, protector devices are employed to protect exchange equipment from the effects of lightning or other high voltage surges and unwanted voltages of lower magnitude (e.g. mains voltages).

FIG. 1 shows one known configuration for dealing with the problem. A protector module 10 is connected by means of contacts 1-5 between the pair of conductors forming a subscribers line and the exchange equipment 11. The module 10 includes a gas discharge device D connected across the lines.

A pair of contacts S1 and S2 are separated from the leads of the discharge device D by a thermal sleeve or coating so that normally there is no electrical connection therebetween, but on conduction of the discharge device at a continuous specificed current will cause melting of the sleeve coating and shorting of the gas tube. The gas discharge device will deal with the instantaneous surges arising from lightning strikes and the thermal sleeve on the contacts S1 and S2 will deal with prolonged voltage presence typically main voltage presence, as the continuous current flowing through the tube will cause it to heat-up and this action melts the sleeve. Thus, the system aims to divert dangerous voltages from the exchange. However, as shown in FIG. 2, the response of such gas discharge tubes is relatively slow and because of the conductive action can cause ringing on the earth rail. In addition, main voltages may not be adequately dealt with.

The present invention is concerned with providing an improved configuration:

According to the invention there is provided a protector device for connection between a telephone line pair and the exchange to protect the exchange against extraneous power sources and surges, said device including a housing, a plurality of contacts associated with the housing for connection between the line pair and the exchange, a voltage sensor connectable across the line pair via the contacts and operable on receipt of a source of over voltage to provide a conductive path therefor, a first fusible current sensor connectable in series with the first line of the pair via the contacts and electrically located between the voltage sensor and the exchange and operable to become open circuit on receipt of a predetermined current, a second fusible current sensor connectable in series with the second line of the pair via the contacts and electrically located between the voltage sensor and the exchange and operable to become open circuit on receipt of a predetermined current, said first and second fusible current sensors each including impedance means in series with a fusible element thereof, and heat sensitive means adjacent the voltage sensor to operable to electrically bypass the voltage sensor on detection of heating resulting from continuous conduction thereof.

The invention will be described by way of example with reference to the accompanying drawings in which:

FIG. 1 shows a known protector module;

FIG. 2 shown electrical responses relating thereto;

FIG. 3(a) shows an embodiment of the present invention;

FIG. 3(b) shows a detail of the fuse mechanism employed in FIG. 3(a);

FIG. 4 shows electrical responses relating to FIG. 3, and

FIG. 5 shows on constructional configuration for the FIG. 3 emodiment.

The FIG. 3 configuration has a solid state protector device P1 comprising a pair of series connected foldback diodes (eg BT type 19A). A pair of thermally sensitive contacts S1 and S2 are provided between the lines. A series connected fuse F1 and F2 with an associated heater element 25 is provided in each line.

The module connects between the subscribers lines and the exchange by means of contacts 1-5. Additional contacts 6, 7 can be provided for testing purposes when removed from use. For example, a faulty module can be tested when plugged into a tester to determine if the fuse or the heater associated with the fuse is faulty, for breakdown logging purposes. The whole module is designed to be discarded when a fault is detected.

Figure 1:
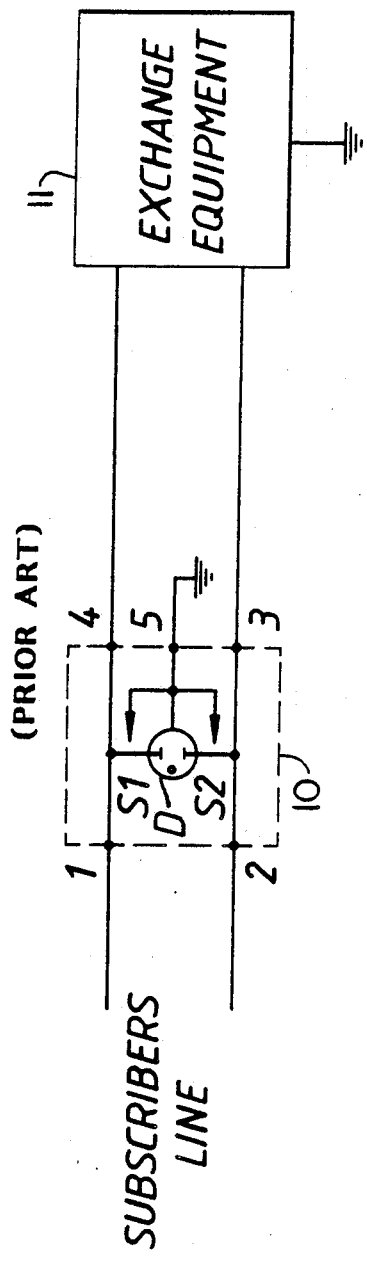
Figure 2:
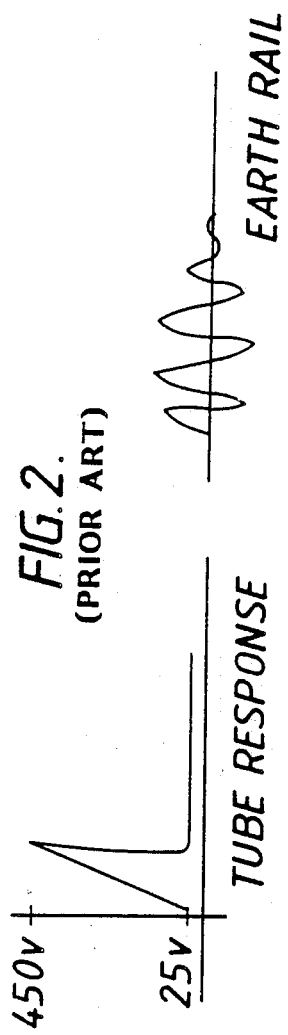

As seen from FIG. 4 (relating to one diode) the response of the diodes in this circuit is much more rapid and the response configuration greatly reduces the ringing compared with the FIG. 2 arrangement. This circuit copes much better and faster with lightning surges. The foldback diodes differ from normal zener diodes in that they do not hold the voltage at their threshold voltage but this drops back (e.g. to 95V as shown). The fuse in each line has an inherent resistance (e.g. 20 $\Omega$) in the form of the heater element 25 which acts as an impedence source between the primary protector diodes across the lines and any secondary protection (as shown by the zener diodes 15, 16) which may be provided within the exchange equipment. With mains voltages being present the fuses will operate to isolate the module from the exchange so safeguarding any sensitive circuit boards within the exchange. Thus, protection is provided under both modes of unwanted voltage and current.

In practice, as shown in FIG. 3(b), the fuse F1 (and F2) incorporates a fuse wire portion F1A and an antisurge coiled portion F1B which prevents blowing on receipt of short occurrence voltages. The wire-wound heater element 25 is in close proximity to the wire F1A so that this assists the blowing of the fuse at low continuous currents, (typically above 0.2A which result from mains voltages) as well as providing an impedance source.

Thus, the FIG. 3 configuration is sufficiently versatile to handle a variety of conditions and is designed to fail-safe rather than allowing the secondary protection in the exchange equipment to fail. To do this the configuration has the protector device P1, the meltable sleeves/contacts S1 and S2 and the fuse with associated resistor/heater which fuse configuration is specifically placed in series with the line at a point after the protector device. This is to ensure that any high voltages which may accidently be present on the subscribers lines are dropped across the resistance 25 to reduce the voltage seen by any secondary protection in the exchange equipment. As the resistor is after the protector P1, the protector will have a high voltage applied so causing it to conduct. If the resistor was placed before the protector P1 then the voltage drop would impair the operation of the protector.

Typically each zener in the exchange equipment will conduct at about 60V so that it would be normal for them to operate when surges or continuous voltages are present on the subscribers lines, but the protection module will operate to prevent damage to these diodes.

In the case of receipt of a continuous high voltage (e.g. mains electricity level), diodes 15 and 16 in the exchange equipment would conduct to earth, but its continued presence would cause fuses F1 and F2 to blow.

Because of the presence of P1 the mains voltage does not float at its incoming level after the fuses have blown but is again conducted to earth, this time by the operation of P1. If this voltage continues to be applied (e.g., for 1 minute or more), the heating effect on the protector P1 and its associated sleeves/contacts S1 and S2 will cause a bypassing short-circuit of the protector P1. This is fail safe, otherwise P1 could rupture in time, and go open circuit, for example, allowing mains voltage to rise again. The module can be replaced when the mains fault is removed.

In the case of a very high voltage surge caused by lightning or otherwise (e.g. 2KV), the secondary protection in the exchange equipment (zeners 15 and 16) would again conduct but so would protector P1, which would see a much higher voltage than the secondary protectors. Because of the antisurge portions F1B, F2B of the fuses F1 and F2, these fuses would not be actuated and protector module P1 would cope with this brief voltage spike. Due to its short duration the sleeves of contact configuration S1, S2 would not melt so that when the surge has ended, the module will be undamaged and ready to cope with any future problems on the lines.

It is unlikely that very high voltages would be present for any length of time, but these could be handled in the fail-safe mode described above.

One configuration for providing the circuit of FIG. 3 is shown in FIG. 5. The module 20 has a generally rectangular insulated body 22 enclosing a printed circuit board 23 and terminating in contacts 1-7. The body 22 is shown cut away for the sake of clarity. A handle portion (not shown) may be provided at the end remote from the contacts to aid insertion/removal of the module. Contact 5 is a plug and contacts 4—4 are sockets. Contacts 6 and 7 are test pads.

The earth connection from contact 5 extends to co-operate with contact 26 when the module is assembled. The plate 24 contacts the meltable sleeves 30, 31 associated with contacts S1 and S2, and is sufficiently resilient to tend to move outwards in the event that the sleeves soften and melt so contacting S1 and S2.

The fuses F1 and F2 terminate in the U-shaped element 25 which is the resistive heater assisting fuse. Connections to the contacts 1-7 are shown in broken lines and correspond electrically to those in FIG. 3.

The connections could be made with wires or other conductors.

Although the module has been shown as having sockets with one plug or pin, in other configurations they could all be sockets (or all pins or plugs).

We claim:

1. A protector device for connection between a telephone line pair and the exchange to protect the exchange against extraneous power sources and surges, said device comprising:
    a housing,
    a plurality of contacts associated with the housing for connection between the line pair and the exchange,
    a voltage sensor including a pair of series-connected solid state semiconductor devices connectable across the line pair via the contacts and operable on receipt of a source of over-voltage to provide a conductive path therefor,
    a first fusible current sensor connectable in series with the first line of the pair via the contacts and electrically located between the voltage sensor and the exchange and operable to become open circuit on receipt of a predetermined current,
    a second fusible current sensor connectable in series with the second line of the pair via the contacts and electrically located between the voltage sensor and the exchange and operable to become open circuit on receipt of a predetermined current,
    said first and second fusible current sensors each including impedance means in series with a fusible element thereof so as to be electrically located between the fusible element and the exchange, said impedance means being positioned adjacent the fusible element and configured as a heater device therefor so as to assist in the fusing thereof at low continuous currents, and
    heat sensitive means adjacent the voltage sensor operable to electrically bypass the voltage sensor on detection of heating resulting from continuous conduction thereof.

2. A device as claimed in claim 1, wherein the solid state devices each comprise a foldback diode and the junction of the series-connected diodes is connectable to an earth line via one of said plurality of contacts associated with the housing.

3. A device as claimed in claim 1 or 2 wherein the first and second fusible current sensors each include an antisurge portion to prevent fusing on receipt of short duration currents.

4. A device as claimed in claim 3, where the fusible element comprises a fusible wire passing through the heater region formed by the impedance means.

5. A device as claimed in claim 4 wherein the impedance means are substantially U-shaped and mounted on a printed circuit board, the fusible wire element passing through an aperture defined by the U-shaped impedance means, the fusible element and the anti-surge portion being supported by means extending from the circuit board.

6. A device as claimed in any preceding claim 1 or 2 wherein the heat sensitive means includes a heat sensitive insulated conductor, the insulation thereof softening or melting on heating.

7. A device as claimed in claim 6 wherein the heat sensitive means includes a resilient member which electrically by-passes the voltage sensor.

8. A device as claimed in claim 7, wherein the resilient member comprises a conductive plate connectable to all electrodes of the voltage sensor on melting of the insulation.

9. A device as claimed in claim 1 or 2, wherein said plurality of contacts are located at one end of said housing and further including a plurality of test points terminating at contacts also located at said one end of the housing to allow testing of the protector components without removal from the housing.

10. In a telephone exchange having secondary semiconductor protection equipment, the provision of a primary protection module for insertion into location means within the exchange, said primary protection module comprising:
    a housing,
    a plurality of contacts associated with the housing for connection between a line pair and the exchange, a voltage sensor including a pair of series-connected solid state semiconductor devices connectable across the line pair via said contacts and operable on receipt of a source of over-voltage to provide a conductive path therefor, a first fusible current sensor connectable in series with the first line of the pair via the contacts and electrically located between the voltage sensor and the exchange and operable to become open circuit on receipt of a predetermined current, a second fusible current sensor connectable in series with the second line of the pair via the contacts and electrically located between the voltage sensor and the exchange and operable to become open circuit on receipt of a predetermined current, said first and second fusible current sensors each including impedance means in series with a fusible element thereof so as to be electrically located between the fusible element and the exchange, and heat sensitive means adjacent the voltage sensor operable to electrically bypass the voltage sensor on detection of heating resulting from continuous conduction thereof whereby both extraneous power sources and surges are dealt with by the primary protection module without damage to the secondary protection equipment.

11. A module as in claim 10, wherein the fusible current sensors fuse when a continuous current in excess of about 200 mA flows therethrough.

12. A module as in claim 10 or 11, wherein the solid state semiconductor devices each comprise a foldback diode configured to have a threshold voltage for initial conduction and a conductive voltage maintained substantially below the threshold.

13. A module as in claim 10 or 11, wherein the first and second fusible current sensors each include an antisurge portion to prevent fusing on receipt of short duration currents.

14. A module as in claim 13, wherein the fusible element comprises a fusible wire passing through a heater region formed by the impedance means.

15. A module as in claim 14, wherein the impedance means is substantially U-shaped and mounted on a printed circuit board, the fusible wire element passing through an aperture defined by the U-shaped impedance means, the fusible element and the anti-surge portion being supported by means extending from the circuit board.

16. A module as claimed in claim 10 or 11, wherein the heat sensitive means includes a heat sensitive insulated resilient conductor, the insulation thereof softening or melting on heating to cause the conductor to move to contact electrodes of the voltage sensor to provide a short-circuit bypass therebetween.

17. A module as claimed in claim 10 or 11, including a plurality of test points located at one end of the housing together with said contacts to allow testing of the protector components without removal from the housing.

18. A protector device for electrical connection between a pair of telephone line conductors and a pair of input terminals in telephone exchange equipment to protect the exchange equipment against extraneous electrical power sources and surges, said protector device comprising:

a pair of input contacts for connection to said pair of telephone line conductors;

a pair of output contacts for connection to the input terminals of the exchange equipment;

a series-connected plurality of solid-state fold-back diodes electrically connected across said input contacts for passing extraneous current from sources and surges of excessive voltage;

a pair of heat sensitive by-pass contacts disposed to short circuit said input contacts in response to heating caused by prolonged current flow through said fold-back diodes;

each input contact being connected to a respectively corresponding output contact by a series-connected fusible link and impedance element connected in that order between the input and output contacts; and each said impedance element including a resistance element disposed to transfer heat to an associated fusible link to assist its fusing at relatively low but prolonged extraneous current flows therethrough.

19. A protector device as in claim 18, wherein each said resistance element includes an open U-shaped link with its associated fusible link passing between the open legs of said U-shaped link.

20. A protector device as in claim 18, wherein each said impedance element includes an inductive element to reduce possible extraneous fusing due to surge currents.

* * * * *